US008706974B2

(12) United States Patent
Moyer

(10) Patent No.: US 8,706,974 B2
(45) Date of Patent: Apr. 22, 2014

(54) SNOOP REQUEST MANAGEMENT IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1472 days.

(21) Appl. No.: 12/112,796

(22) Filed: Apr. 30, 2008

(65) Prior Publication Data

US 2009/0276580 A1 Nov. 5, 2009

(51) Int. Cl.
*G06F 12/00* (2006.01)

(52) U.S. Cl.
USPC .................................. 711/146; 711/E12.052

(58) Field of Classification Search
USPC .......................................................... 711/146
See application file for complete search history.

(56) References Cited

U.S. PATENT DOCUMENTS

| 5,506,971 | A | * | 4/1996 | Gullette et al. ............... 710/116 |
| 5,522,057 | A | | 5/1996 | Lichy |
| 5,699,548 | A | | 12/1997 | Choudhury et al. |
| 5,761,725 | A | | 6/1998 | Zeller et al. |
| 5,860,114 | A | | 1/1999 | Sell |
| 5,920,892 | A | | 7/1999 | Nguyen |
| 6,021,468 | A | | 2/2000 | Arimilli et al. |
| 6,292,906 | B1 | * | 9/2001 | Fu et al. ........................ 714/6.24 |
| 6,601,144 | B1 | | 7/2003 | Arimilli et al. |
| 6,845,432 | B2 | * | 1/2005 | Maiyuran et al. ............. 711/154 |
| 7,234,029 | B2 | | 6/2007 | Khare et al. |
| 7,373,462 | B2 | * | 5/2008 | Blumrich et al. ............. 711/146 |
| 2003/0005236 | A1 | | 1/2003 | Arimilli et al. |
| 2003/0195939 | A1 | | 10/2003 | Edirisooriya et al. |
| 2004/0123046 | A1 | | 6/2004 | Hum et al. |
| 2005/0071573 | A1 | | 3/2005 | Dodson et al. |
| 2005/0251626 | A1 | | 11/2005 | Glasco |
| 2005/0251628 | A1 | | 11/2005 | Jarvis et al. |
| 2008/0091884 | A1 | | 4/2008 | Piry et al. |
| 2008/0183972 | A1 | * | 7/2008 | Dieffenderfer ............... 711/146 |

OTHER PUBLICATIONS

Office Action mailed Feb. 18, 2011 in U.S. Appl. No. 12/112,508.
U.S. Appl. No. 11/969,112, filed Jan. 3, 2008.
U.S. Appl. No. 12/112,508, filed Apr. 30, 2008.
U.S. Appl. No. 12/112,502, filed Apr. 30, 2008.
PCT Application No. PCT/US2009/034866 in related U.S. Appl. No. 11/112,502; Search Report and Written Opinion mailed Sep. 30, 2009.
Office Action mailed May 27, 2011 in U.S. Appl. No. 12/112,502.

(Continued)

*Primary Examiner* — Reginald Bragdon
*Assistant Examiner* — Hamdy S Ahmed
(74) *Attorney, Agent, or Firm* — David G. Dolezal; Joanna G. Chiu

(57) ABSTRACT

In a data processing system, a method includes a first master initiating a transaction via a system interconnect to a target device. After initiating the transaction, a snoop request corresponding to the transaction is provided to a cache of a second master. The transaction is completed. After completing the transaction, a snoop lookup operation corresponding to the snoop request in the cache of the second master is performed. The transaction may be completed prior to or after providing the snoop request. In response to performing the snoop lookup operation, a snoop response may be provided, where the snoop response is provided after completing the transaction. When the snoop response indicates an error, a snoop error may be provided to the first master.

22 Claims, 5 Drawing Sheets

(56) References Cited

OTHER PUBLICATIONS

Final Office Action mailed Jul. 7, 2011 in U.S. Appl. No. 12/112,502.
Office Action Rejection mailed Feb. 22, 2013 in U.S. Appl. No. 12/112,502.
U.S. Appl. No. 12/112,502, Inventor Willaim C. Moyer, "Cache Coherency Protocol in a Data Processing System1", filed Apr. 30, 2008, Office Action—Rejection, mailed Aug. 16, 2012.
Final Office Action mailed Jul. 7, 2011 in U.S. Appl. No. 12/112,508.
U.S. Appl. No. 12/053,761, filed Mar. 24, 2008.
U.S. Appl. No. 12/112,508, Inventor William C. Moyer, "Cache Coherency Protocol in a Data Processing System", filed Apr. 20, 2008, Office Action—Notice of Allowance, mailed Dec. 7, 2012.
U.S. Appl. No. 12/112,502, Inventor William C. Moyer, filed Apr. 30, 2008, Office Action mailed Aug. 16, 2012.
Office Action mailed Nov. 28, 2011 in U.S. Appl. No. 12/112,502.
Office Action mailed Jun. 8, 2012 in U.S. Appl. No. 12/112,508.
Office Action mailed Feb. 12, 2014 in U.S. Appl. No. 12/112,502.
Office Action mailed Nov. 19, 2013 in U.S. Appl. No. 12/112,502.

* cited by examiner

SNOOP REQUEST MANAGEMENT IN A DATA PROCESSING SYSTEM

BACKGROUND

1. Field

This disclosure relates generally to data processing systems, and more specifically, to cache coherency in a data processing system.

2. Related Art

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multi-master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to all caches in the system to search for any address in the caches that match the snoop address. A snoop hit occurs for every match, and any needed corrective action is taken to maintain coherency of the data at the address in the cache where the snoop hit occurs.

Existing coherency mechanisms require low latency for responding to snoop requests in order to avoid impacting subsequent transactions by one or more masters in a data processing system. Consequently, with these systems, subsequent transactions can not be completed until all snoop responses have been obtain from caches within the system. This can reduce the efficiency of a data processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
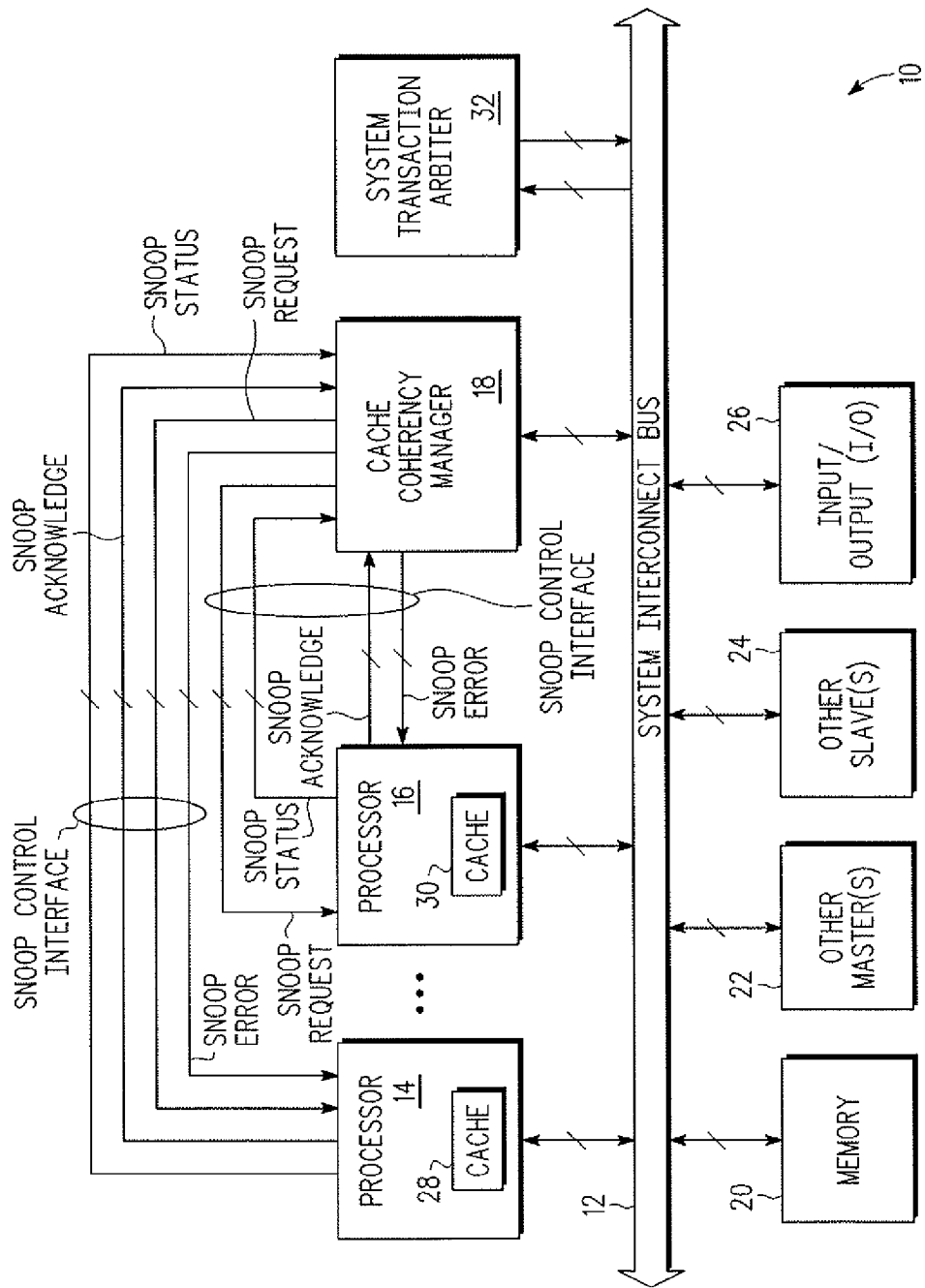
FIG. 1 is a block diagram of a data processing system according to one embodiment of the present invention.

FIG. 1 illustrates, in block diagram form, a data processing system 10 according to one embodiment of the present invention. Data processing system 10 includes devices that enable data transactions to be completed prior to performing a snoop lookup operation. Data processing system 10 includes processor 14, processor 16, cache coherency manager 18, system transaction arbiter 32, system memory 20, other master devices 22, other slave devices 24, and input/output I/O devices 26. The devices shown in FIG. 1 are communicatively coupled to a system interconnect bus 12 but maybe coupled by other types of system interconnects in other embodiments. For example, the devices shown may be communicatively coupled by a system interconnect that includes a cross bar switch or other type of switch, or a system interconnect that includes multiple busses and/or switches. In one embodiment, a system interconnect bus may include multiple signal lines for address, data, and control information.

System transaction arbiter 32 arbitrates among various masters of system 10 for transactions on a system interconnect bus 12. I/O devices 26 may be any number of I/O devices such as keyboard controllers and communications ports. Other slave devices 24 may include memory devices such as a system cache (e.g. L2 cache). Both devices 24 and 26 may be accessible by transactions on system interconnect bus 12 that are generated by the master devices of the system (e.g. processor 14, processor 16, or other master devices 22). In one embodiment, other master devices 22 includes other types of processors (e.g. a digital signal processor) or a direct memory access (DMA) device which can generate transactions on system interconnect bus 12. In one embodiment, each master device may also include a cache (not shown).

System 10 includes a cache coherency manager 18 that snoops system interconnect bus 12 for transactions and initiates snoop requests for various caches of system 10 (e.g. cache 28, cache 30) of system 10 to determine whether the caches include the data operand of the transaction. If a cache contains the data operand, then that cache will invalidate the data operand in response to the snoop request.

One example of a transaction is a write transaction by processor 16 to system memory 20 for writing data to a location in memory 20. In response to the transaction, cache coherency manager 18 would generate a snoop request to the other caches (e.g. cache 28) to search for data of the same memory address. If a cache has an entry corresponding to the same memory address, then the cache would invalidate that data since an updated version is being provided to memory 20 on system interconnect bus 12.

In the embodiment shown, system 101 includes a snoop control interface between the cache coherency manager 18 and each of the processors 14 and 16 for exchanging information regarding snooping operations. In the embodiment shown, the snoop control interface includes snoop request lines, snoop status lines, snoop acknowledge lines, and snoop error lines. These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. master devices 22, slave devices 24, and other caches). In alternative embodiments, processors 14 and 16 may include additional caches.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

Figure 2:
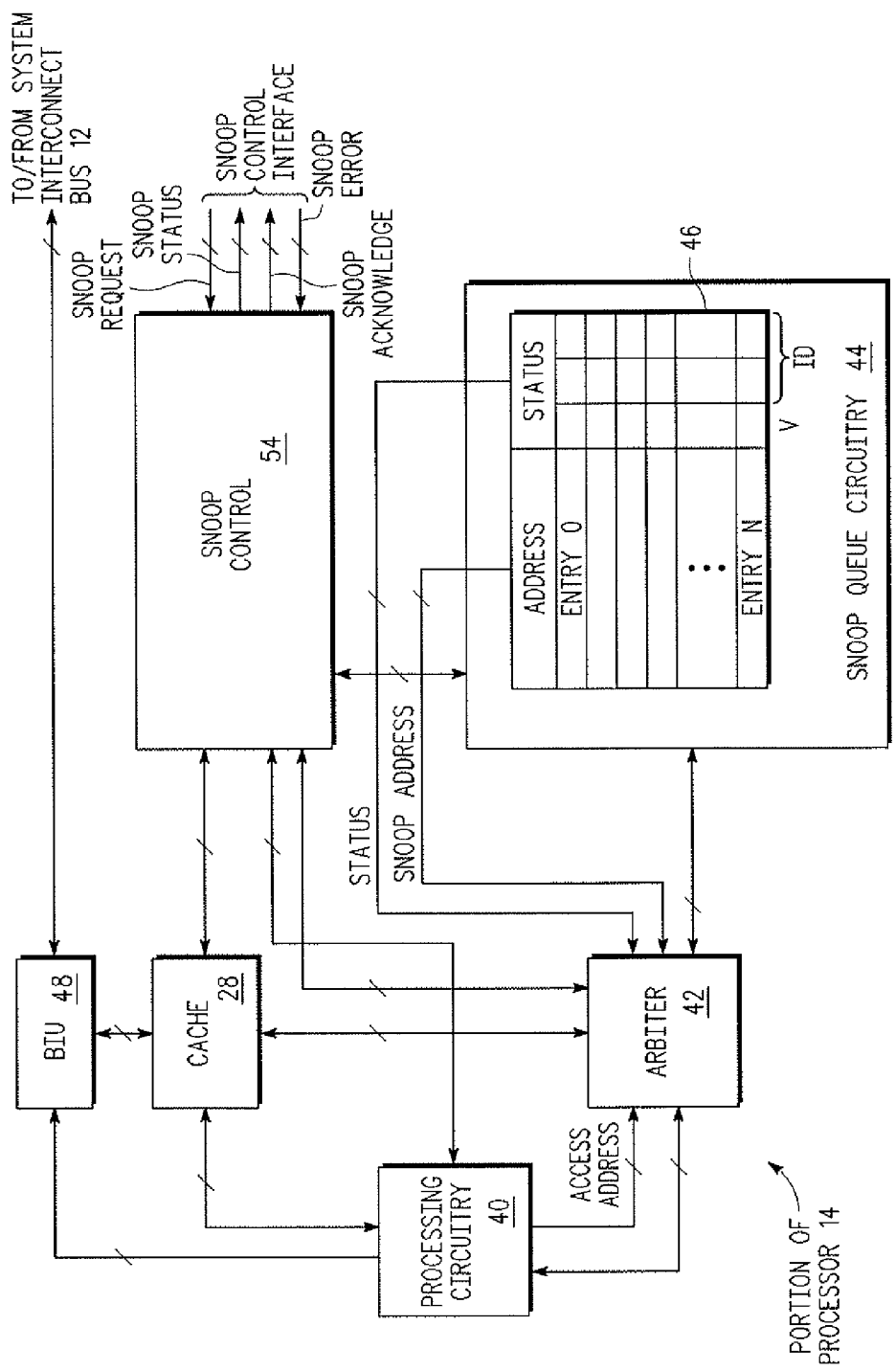
FIG. 2 is a block diagram of one embodiment of a portion of a processor according to one embodiment of the present invention.

FIG. 2 is a block diagram of a portion of processor 14 according to one embodiment of the present invention. In FIG. 2, processor 14 includes cache 28, processing circuitry 40, an arbiter 42, a bus interface unit (BIU) 48, snoop control 54, and snoop queue circuitry 44.

Processing circuitry 40 may include circuitry typically found in a processor such as e.g. an instruction pipe unit, execution units, an instruction fetch unit, control circuitry, general purpose registers, a load store unit, and a prefetch unit. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by a load/store unit or prefetch unit of circuitry 40) processing circuitry 40 will check cache 28 (via arbiter 42) to see if it has any data that corresponds to that system memory address. If not, a load store unit of processing circuitry 40 will generate via BIU 48 a transaction on system interconnect bus 12 to request data from memory 20 at that system address. In response to the read transaction, the system memory 20 will provide the requested data on system interconnect bus 12 to processor 14 wherein BIU 48 receives the data and provides the data to processing circuitry 40 and to cache 28 in some embodiments. After receiving the data by processor 14, the transaction is complete. Write transactions to memory 20 can be initiated by processor 14 where a write address and data are provided on interconnect bus 12 to be written to memory 20 at the address. Also, data may be written to or read from other slave devices 24 and I/O devices 26 of data processing system 10 in other embodiments.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in memory 20 and other caches of data processing system 10. Snoop control 54 receives snoop requests from cache coherency manager 18 via the snoop control interface. Processor 14 includes snoop queue circuitry 44 including a snoop queue 46 for storing snoop requests received from the snoop control interface. In one embodiment, the snoop request queue 46 may be implemented as a FIFO. In one embodiment, the FIFO may be implemented as a circular buffer.

Within the snoop request queue 46 is a plurality of (N+1) entries where N is an integer. Each entry in the snoop request queue 46 has an address field and a status field that includes status information. The address field stores the address of the transaction for which a snoop request was generated. In the embodiment shown, a first status bit is a valid (V) bit which indicates whether the entry in the snoop request queue 46 is valid. Other types of status bits may be included in other embodiments. Each entry also includes a snoop request ID field that stores the snoop request ID for the snoop request generated by the cache coherency manager.

In operation, snoop control 54 and snoop queue circuitry 44 operate to keep cache 28 coherent with other copies of the information in system 10. Snoop control 54 receives a snoop request from cache coherency manager 18 via the snoop control interface and provides the address of the snoop request, along with the request ID to be stored in queue 46. The arbiter 42 arbitrates access to the cache 28 between the processing circuitry 40 and snoop queue circuitry 44 in an efficient manner to minimize the time that processing circuitry 40 does not have access to cache 28. The minimization of accesses to cache 28 by the snoop control circuitry may be accomplished in one embodiment, by selectively merging or collapsing two or more snoop address lookups into a single snoop address lookup.

When a snoop request is received by snoop control 54, snoop control 54 routes the snoop address to the snoop queue circuitry 44. Various embodiment of the function of snoop queue circuitry 44 may be implemented. In one embodiment, all received snoop addresses from the snoop control 54 are stored in the snoop request queue 46. When arbiter 42 provides the snoop queue circuitry 44 with access to the cache 28, access addresses from the processing circuitry 40 are not permitted to cache 28 via the arbiter 42. In this mode of operation, arbiter 42 provides the snoop addresses from the snoop request queue 46 to the cache 28 for searching. The snoop addresses are removed from the snoop request queue 46 on a first-in, first-out (FIFO) basis.

When a snoop address is present in the snoop request queue 46, the snoop queue circuitry 44 signals arbiter 42 to request arbiter 42 to arbitrate for access to the cache 28. In one embodiment, cache 28 has a single set of address tags and therefore must be either be dedicated to the processor for addressing or to the snoop queue circuitry for addressing. When arbiter 42 prevents access by the processing circuitry 40 to cache 28, snoop addresses from circuitry 44 are routed through the arbiter 42 to the cache 28. Circuitry within the cache 28 compares the snoop address with all the addresses presently stored in the cache 28. If a match occurs, the matching entry in cache 28 is marked as invalid since it is potentially different from of the entry of the transaction on system interconnect bus 12. If no match occurs, no further action is taken within cache 28. In some embodiments, snoop control 54 may signal arbiter 42 to arbitrate for access to cache 28.

In one embodiment, snoop address compression may be performed by circuitry 44 to reduce the time that circuitry 44 has access to cache 28. In one form of snoop address compression, before a snoop address is outputted from the head of the snoop queue, a comparison of the next two or more snoop addresses is performed by comparison logic (not shown). The number of snoop addresses that are compared concurrently is a choice of design. When comparing two snoop addresses by circuitry 44, if the addresses have the same tag and index portions, the second address is not provided for snooping and a count value is created indicating that a pair of snoop addresses were combined or collapsed into one snoop address. A same tag and index portion for two addresses indicates that both addresses are within a same line of memory. By not sending both snoop addresses to the cache 28, the time that the cache 28 is diverted from the processing circuitry 40 for snooping is significantly reduced. See for example, the US patent application entitled "Snoop Request Management in a Data Processing System," having an application number of Ser. No. 11/969,112, having a filing date of Jan. 3, 2008, and having a common assignee all of which is incorporated by reference in its entirety.

In the embodiment shown, the snoop control interface includes a snoop request signal interface, a snoop status signal interface, a snoop acknowledgement signal interface, and a snoop error signal interface.

In one embodiment, the snoop request signal interface includes a request signal line for indicating that a request being made, a snoop command line indicating the type of bus transaction that generated the snoop, a snoop address line which is the address of the transaction being snooped, and a snoop request ID line, which is a number generated by the cache coherency manager identifying the snoop request. These signal lines may be multi-bit (either in parallel or serial in some embodiments) or single bit in some embodiments.

The snoop acknowledge signal interface is used to indicate to the cache coherency manager 18 that a snoop request has been processed by the cache. The snoop status interface provides the result of the cache snoop (e.g. whether an entry for the data address was found in the cache or not or whether an error (parity bit) was found with the data of the entry). In one embodiment, the snoop acknowledge interface includes a snoop response line and a snoop request ID line indicating the ID number of the snoop request. These lines may be multi-bit as well.

The snoop control interface includes a snoop error signal line. The snoop error signal line is used by the cache coherency manager 18 to indicate to a processor that a transaction generated by the processor resulted in an error from another cache when snooped. Examples of errors include whether another cache finds that the data associated with the snooped address had a parity error or an ECC error.

In other embodiments, system 10 may include processors of other configurations and/or that perform transactions and snoop operations in a different manner. For example, a processor may have other circuitry not shown in FIG. 2 or may not include all of the circuitry shown in FIG. 2. Also, a processor may include other circuitry for handling snoop requests in another manner as well.

Figure 3:
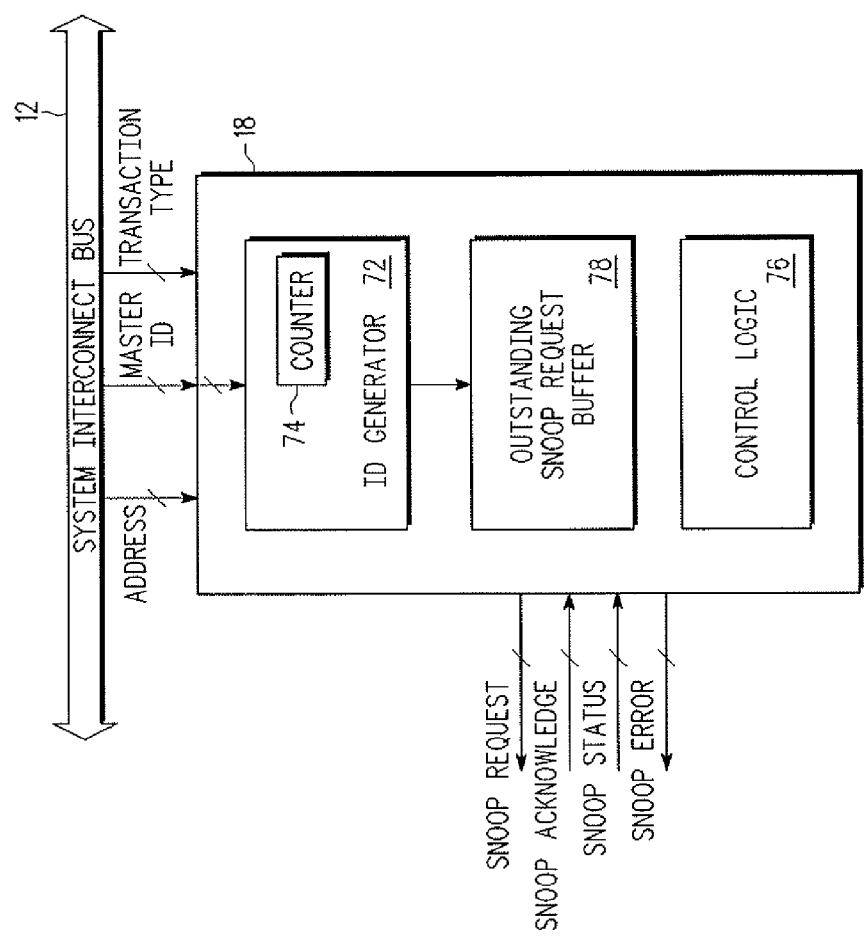
FIG. 3 is a block diagram of a cache coherency manager according to one embodiment of the present invention.

FIG. 3 is block diagram of one embodiment of cache coherency manager 18. Manager 18 is communicatively coupled to interconnect bus 12 to monitor the bus for write and read transactions that may require snooping of other caches in data processing system 10. In the embodiment, manager 18 receives the address of the transaction from address lines, receives the master ID that generated a transaction from master ID lines, and receives a transaction type of the transaction from transaction type lines. In other embodiments, manager 18 may receive other types of data from interconnect bus 12. Manager 18 includes control logic 76 for controlling and performing operations of manager 18.

In one embodiment, snoop requests to the caches of system 10 are generated only in response to certain types of transactions on interconnect bus 12. For example, in some embodiments, only write transactions generate snoop requests.

Manager 18 also includes an ID generator 72 for generating a request ID for each snoop request. Because data processing system 10 can complete transactions prior to the generation of the snoops for that transaction, manager 18 has the ability to generate IDs to distinguish a snoop request caused by one transaction from a snoop request generated by another transaction.

In one embodiment, each ID includes a first number of bits indicating the Master ID and a second number of bits indicating a sequential number for each snoop request generated by a transaction of the master. The sequential number is generated by counter 74. Counter 74 may includes a different count for each master of system 10. In other embodiments, the count is incremented for each transaction that generates a snoop request regardless of the master initiating the transaction.

Manager 18 also includes a buffer 78 for storing outstanding snoop requests. In one embodiment, snoop requests are retired when snoop status signals are received from all caches to which a snoop request was sent.

Figure 4:
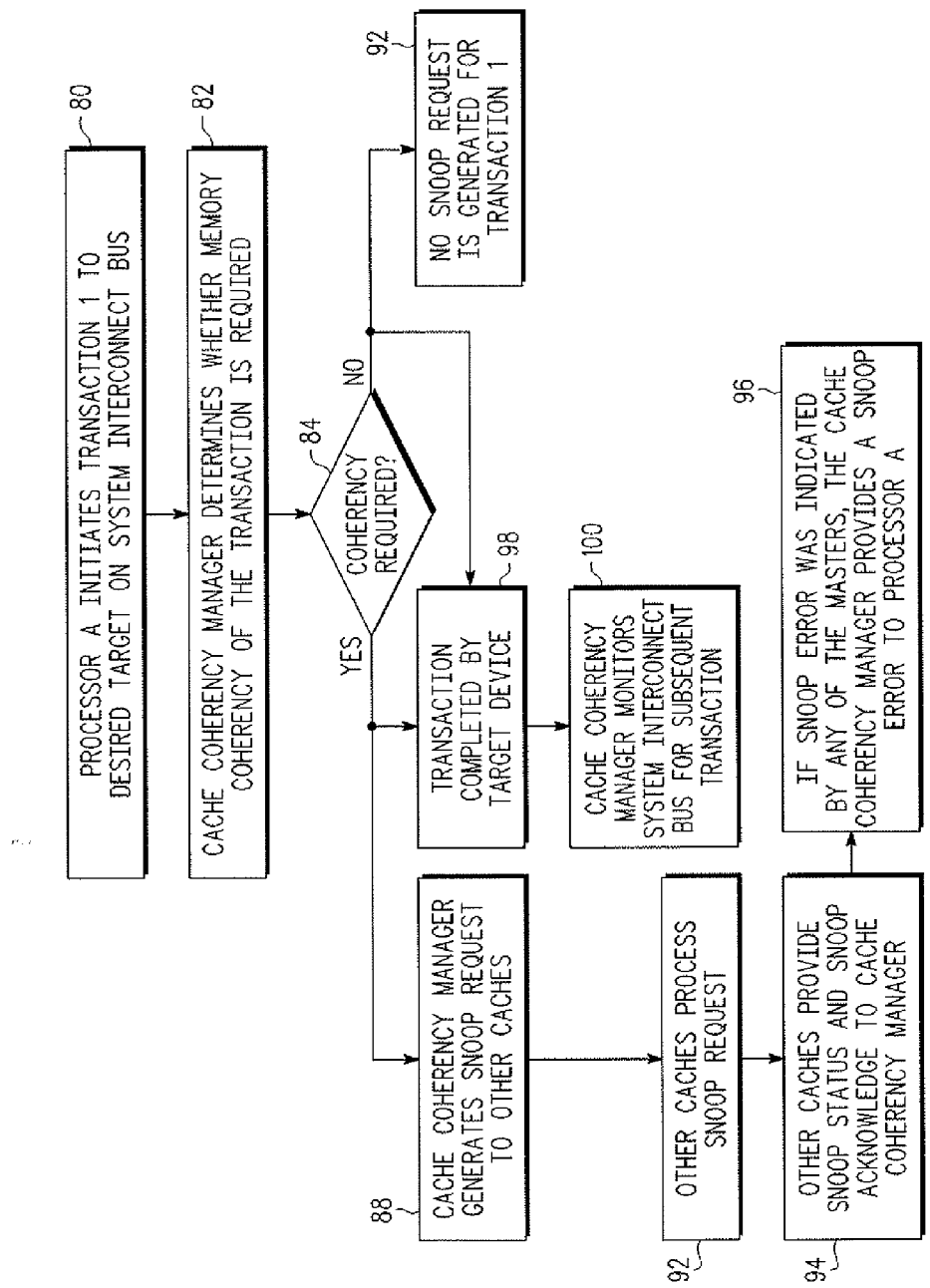
FIG. 4 is a flow diagram according to one embodiment of the present invention.

FIG. 4 includes flow diagram showing one embodiment of the operation of data processing system in performing cache coherency operations.

In operation 80, processor A (processor 14, 16, or another master device 22) initiates a transaction 1 to a desired target on system interconnect bus 12. In operation 82, cache coherency manager 18 determines whether memory coherency of transaction 1 is required for all other caches (or some caches) of data processing system 10. In one embodiment, the determination of whether coherency is required is based on the transaction type, the master generating the transaction, or the desired target (e.g. a write to memory 20).

If coherency is required (operation 84), then in operation 88, the cache coherency manager 18 generates a snoop request to the other caches of data processing system 10. For example, if processor 16 generated the transaction, manager 18 would send a snoop request via the snoop control interface to cache 28. This snoop request would be received by snoop control 54 of processor 14. A snoop request is not sent to cache 30, in one embodiment, since processor 16 generated the snoop request.

In operation 92, the caches process the snoop request by checking their locations for an address matching the memory address of transaction 1. In operation 94, the caches provide the results of the processing of their snoop request to manager 18 via the snoop acknowledge interface and snoop status interface. If there was a snoop error reported by any of the caches via the snoop status interface, then in operation 96, manager 18 reports that error to processor A via the snoop error interface.

Concurrently with (or before) the generation and processing of the snoop requests, transaction 1 is completed by the target device in operation 98. After the completion of transaction 1 in operation 98, the system interconnect bus 12 is ready to receive another transaction, wherein cache coherency manager 18 monitors the system interconnect bus 12 for another transaction in operation 100.

If coherency of the transaction is not required in operation 84, then no snoop requests are generated in 92 and the transaction is allowed to complete in operation 98.

In other embodiments, a data processing system may perform cache coherency operations by other methods.

As shown in FIG. 4, the processing of snoop requests is performed independently of the completion of the transaction that generated the snoop request. Accordingly, with this embodiment, a subsequent transaction may be initiated (and completed) before the completion of the processing of the snoop requests by the caches in operation 92. In the embodiment of FIG. 2, each cache includes a cache queue circuitry 44 that allows for multiple snoop requests to be stored. Also, in the embodiment of FIG. 3, cache manager 18 includes an ID generator 72 and request buffer that allow for multiple snoop requests to be outstanding at any one time.

By completing the transaction prior to the processing of the snoop requests, the system 10 allows for a more efficient use of a system interconnect and allows for more transactions to be completed.

With prior art systems, subsequent transactions could not be performed until the cache snoop requests had been processed in order to ensure cache coherency. With system 10, for those instances where coherency errors may occur where invalid data is used by other processors prior to be invalidated in a cache, such situations may be handled by high level software interrupts which interrupt processing based on the detection of the use of invalid data in a cache. Alternatively, coherent use of data may be managed through the use of semaphore operations by software executing in system 10. In some embodiments, with the coherency protocol incorporated by the various elements of system 10, an immediate handling of snoop lookup operations of prior art systems is no longer needed. Snoop lookup operations are thus decoupled from the completion of transactions initiated by the masters of system 10, and do not impact completion of those transactions, allowing for increased efficiency of operation of system 10.

Figure 5:
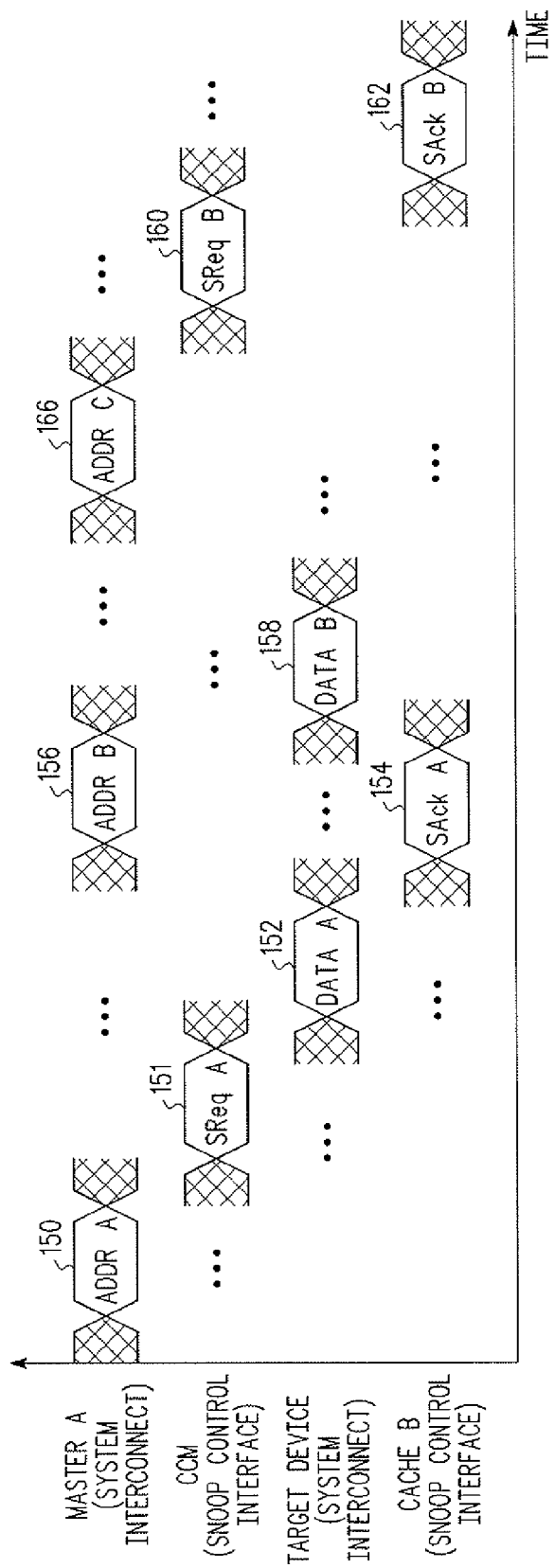
FIG. 5 is a timing diagram according to one embodiment of the present invention.

FIG. 5 is a timing diagram illustrating how a transaction can be completed before the results of a snoop request are returned. Signal 150 is the initiation of a transaction A (the providing the address of transaction A on a system interconnect) by the master of transaction A. Signal 151 is a snoop request being providing by the cache coherency manager 18 on a snoop control interface. Signal 152 is the data of transaction A being provided on system interconnect bus 12 to the target device by the master of transaction A. Signal 154 is the snoop acknowledgement provided by the cache to manager 18 on the snoop control interconnect. As shown in FIG. 5, transaction A is completed (as shown by the end of signal 152) before the results of the snoop requests are returned as indicated in signal 154.

Signal 156 is the initiation of a transaction B (the providing the address of transaction B on a system interconnect) by master A to a target device. Signal 160 is a snoop request being providing by the cache coherency manager 18 on a snoop control interface. Signal 158 is the data provided on system interconnect bus 12 by the master of transaction B to be written to a target device. Signal 162 is the snoop acknowledgement by the cache provided to manager 18 on the snoop control interface. As seen from FIG. 5, transaction B is completed (as indicated by the completion of signal 158 prior to the generation of the snoop request (signal 160) for that transaction.

With the completion of transaction B, the system interconnect is able to process another transaction prior to the receipt of the snoop request for transaction B. In FIG. 5, signal 166 is the initiation of transaction C (the providing the address of transaction C on the system interconnect) by master A to a target device. Signal 166 occurs before a snoop request (signal 160) is sent by manager 18 for transaction B. Although a data signal for C is not shown in FIG. 5, transaction C may be completed prior to generating the snoop request for transaction B (signal 160). In the embodiment shown, all transactions are generated by Master A. However, in other embodiments, transactions A, B, and C maybe generated by different masters. in some embodiments, a transaction is completed by an acknowledgement signal from the target device to the master.

In one embodiment, a data processing system includes a system interconnect and a first master communicatively coupled to initiate a transaction on the system interconnect. The transaction has a corresponding access address. The system includes a second master and a cache coherency manager communicatively coupled to the system interconnect. The second master includes a cache and snoop circuitry which receives snoop requests from the cache coherency manager. A snoop lookup in the cache is performed for received snoop requests, and, in response to each snoop lookup, a snoop response is provided to the cache coherency manager. When the cache coherency manager provides a snoop request corresponding to the transaction initiated by the first master to the snoop circuitry of the second master, the snoop circuitry is configured to be capable of performing a snoop lookup operation for the snoop request corresponding to the transaction initiated by the first master after completion of the transaction initiated by the first master on the system interconnect. A second transaction subsequent to the transaction can be initiated on the system interconnect prior to the completion of the snoop lookup.

In another embodiment, in a data processing system, a method includes a first master initiating a transaction via a system interconnect to a target device. The method also includes after the first master initiating, providing a snoop request corresponding to the transaction to a cache of a second master. The method further includes completing the transaction and after the completing, performing a snoop lookup operation corresponding to the snoop request in the cache of the second master.

In another embodiment, in a data processing system, a method includes a first master initiating a transaction via a system interconnect to a target device and after the first master initiating, a cache coherency manager providing a snoop request corresponding to the transaction to a cache of the data processing system. The method also includes completing the transaction and performing a snoop lookup operation corresponding to the snoop request in the cache. The method further includes in response to the performing the snoop lookup operation, providing a snoop response to the cache coherency manager. The providing the snoop response is performed after the completing the transaction.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A data processing system, comprising:
 a system interconnect;
 a first master communicatively coupled to initiate a transaction on the system interconnect, the transaction having a corresponding access address;
 a cache coherency manager communicatively coupled to the system interconnect; and
 a second master, the second master comprising:
  a cache; and
  snoop circuitry which receives snoop requests from the cache coherency manager, wherein a snoop lookup in the cache is performed for received snoop requests, and, in response to each snoop lookup, a snoop response is provided to the cache coherency manager,
 wherein when the cache coherency manager provides a snoop request corresponding to the transaction initiated by the first master to the snoop circuitry of the second master, the snoop circuitry is configured to be capable of performing a snoop lookup operation for the snoop request corresponding to the transaction initiated by the first master after completion of the transaction initiated by the first master on the system interconnect, and wherein a second transaction subsequent to the transaction can be initiated on the system interconnect prior to the completion of the snoop lookup;

the cache coherency manager is communicatively coupled to the system interconnect to snoop transactions on the system interconnect, the cache coherency manager provides a snoop request to the snoop circuitry responsive to a snooped transaction on the system interconnect.

2. The data processing system of claim 1, wherein the snoop circuitry comprises a snoop request queue for storing the snoop requests received from the cache coherency manager.

3. The data processing system of claim 1, wherein when a snoop response provided by the snoop circuitry to the cache coherency manager in response to performing the snoop lookup operation for the snoop request corresponding to the transaction initiated by the first master indicates an error, the cache coherency manager provides a snoop error indicator to the first master.

4. The data processing system of claim 1, wherein the cache coherency manager comprises a snoop identifier generator which generates a snoop identifier for each snoop request provided to the snoop circuitry, wherein when the cache coherency manager provides the snoop request corresponding to the transaction initiated by the first master to the snoop circuitry of the second master, the cache coherency manager also provides a corresponding snoop identifier, the corresponding snoop identifier comprises a first value corresponding to the first master and a second value generated by the cache coherency manager.

5. The data processing system of claim 1, wherein when a snoop response provided to the cache coherency manager in response to the snoop lookup operation for the snoop request corresponding to the transaction initiated by the first master, the corresponding snoop identifier is also provided to the cache coherency manager.

6. The data processing system of claim 1 wherein the cache is characterized as one of a group consisting of a data cache, an instruction cache, and a data and instruction cache.

7. In a data processing system, a method comprising:
a first master initiating a transaction via a system interconnect to a target device;
snooping the transaction on the system interconnect by a cache coherency manager, wherein responsive to the snooped transaction, the cache coherency manager provides a snoop request corresponding to the transaction to a cache of a second master, wherein the cache is characterized as one of a group consisting of a data cache, an instruction cache, and a data and instruction cache;
completing the transaction;
after the completing, performing a snoop lookup operation corresponding to the snoop request in the cache of the second master.

8. The method of claim 7, wherein the completing the transaction is performed prior to the providing the snoop request.

9. The method of claim 7, wherein the providing the snoop request comprises:
providing a snoop address corresponding to an access address of the transaction.

10. The method of claim 9, wherein the providing the snoop request comprises:
storing the snoop address in an entry of a snoop queue, the snoop queue communicatively coupled to provide snoop requests to the cache.

11. The method of claim 9, wherein providing the snoop request further comprises:
providing a snoop request identifier with the snoop address.

12. The method of claim 11, wherein the providing the snoop request further comprises storing the snoop address and the snoop request identifier in an entry of a snoop queue, the snoop queue communicatively coupled to provide snoop requests to the cache.

13. The method of claim 7, further comprising:
after the performing the snoop lookup operation, providing a snoop response which indicates a status of the snoop lookup operation.

14. The method of claim 13, wherein the snoop response includes a snoop request identifier which identifies the snoop request corresponding to the snoop response.

15. The method of claim 13, wherein when the status of the snoop lookup operation indicates an error occurred, providing a snoop error response to the first master.

16. The method of claim 7, further comprising:
after the completing the transaction and prior to the performing the snoop lookup operation, the first master initiating a second transaction via the system interconnect to the target device.

17. In a data processing system, a method comprising:
a first master initiating a transaction via a system interconnect to a target device;
snooping the transaction on the system interconnect by a cache coherency manager, wherein responsive to the snooped transaction, the cache coherency manager provides a snoop request corresponding to the transaction to a cache of the data processing system, wherein the cache is characterized as one of a group consisting of a data cache, an instruction cache, and a data and instruction cache;
completing the transaction;
performing a snoop lookup operation corresponding to the snoop request in the cache; and
in response to the performing the snoop lookup operation, providing a snoop response to the cache coherency manager, wherein the providing the snoop response is performed after the completing the transaction.

18. The method of claim 17, wherein the performing the snoop lookup operation is performed after the completing the transaction.

19. The method of claim 17, wherein the cache coherency manager providing the snoop request is performed after the completing the transaction.

20. The method of claim 17, further comprising:
storing the snoop request provided by the cache coherency manager in a snoop request queue communicatively coupled to provide snoop requests to the cache, wherein the snoop request comprises a snoop address corresponding to an access address of the transaction and a snoop identifier which includes a master identifier which identifies the first master.

21. The method of claim 17, further comprising:
when the snoop response indicates an error, the cache coherency manager providing a snoop error to the first master.

22. The method of claim 17 further comprising:
  initiating a second transaction via a system interconnect to a target device after completing the transaction;
  completing the second transaction, wherein the completing the second transaction is performed before the providing a snoop response to the cache coherency manager.

* * * * *